(12) United States Patent
Kailash et al.

(10) Patent No.: US 8,010,526 B1
(45) Date of Patent: Aug. 30, 2011

(54) INSTANCE COUNTING AND RANKING

(75) Inventors: Kailash Kailash, San Jose, CA (US); Jose Raphel, Austin, TX (US)

(73) Assignee: Zscaler, Inc., Sunnyvale, CA (US)

( * ) Notice: Subject to any disclaimer, the term of this patent is extended or adjusted under 35 U.S.C. 154(b) by 494 days.

(21) Appl. No.: 12/182,428

(22) Filed: Jul. 30, 2008

(51) Int. Cl.
*G06F 7/00* (2006.01)

(52) U.S. Cl. ........................................ 707/723; 707/725

(58) Field of Classification Search .................. 707/705, 707/706, 709, 736, 737, 748, 751, 723, 725; 715/206
See application file for complete search history.

(56) References Cited

U.S. PATENT DOCUMENTS

| | | | |
|---|---|---|---|
| 6,839,680 B1 * | 1/2005 | Liu et al. ...................... | 705/7.33 |
| 7,308,643 B1 * | 12/2007 | Zhu et al. ...................... | 715/206 |
| 7,475,069 B2 * | 1/2009 | Blackman et al. ................... | 1/1 |
| 2007/0239701 A1 * | 10/2007 | Blackman et al. ................. | 707/5 |
| 2008/0154847 A1 * | 6/2008 | Chellapilla et al. ............... | 707/3 |
| 2008/0256046 A1 * | 10/2008 | Blackman et al. ................. | 707/3 |

* cited by examiner

*Primary Examiner* — Hung T Vy
(74) *Attorney, Agent, or Firm* — Clements Bernard PLLC; Lawrence A. Baratta, Jr.; Christopher L. Bernard (57) ABSTRACT

In one general aspect, entity instances are monitored during a first interval, each entity instance being one of several types of entity instances. A first ranked list of entity instances is determined from the entity instances monitored during the first interval. The types of entity instances are ranked in the first list according to the number of times each type of entity instance occurred during the first interval and the first ranked list has a first cardinality of types of entity instances. Entity instances are monitored during a second interval. A second ranked list of entity instances is determined. The second ranked list has the first cardinality of types of entity instances. The first ranked list and the second ranked list are merged into a third ranked list of entities instances. The third ranked list has a second cardinality that is less than or equal to the first cardinality.

22 Claims, 7 Drawing Sheets

INSTANCE COUNTING AND RANKING

BACKGROUND

This disclosure relates to counting and ranking entity instances, such as counting and ranking webpage requests.

Enterprise systems often are required to identify the top N entity instance types accessed from a large collection of entities at regular intervals of time. Entity instance types may correspond to unique files, webpages, domains and other network properties available to users of the enterprise system. One common request is to identify the top N webpages from a log of a large collection of web page accesses at specific intervals of time.

Existing methods require storage of the web accesses and maintaining the counts of all the web accesses. This approach requires large amount of memory for storing the counts and significant processing time for generating reports ranking the web accesses based on the stored counts. In addition, this approach does not provide web access ranking in real time.

SUMMARY

In general, one aspect of the subject matter described in this specification can be embodied in methods that include the actions of counting entity instances for measurement intervals, each entity instance being one of a plurality of types of entity instances; for each measurement interval, generating a corresponding ranked measurement list of entity instances in which the types of entity instances are ranked according to the number of times each type of entity instance occurred during the corresponding interval, each ranked measurement list of entity instances having a cardinality equal to a first cardinality; determining a reporting interval that is equal to or greater than the measurement interval, and for each reporting interval identifying a ranked measurement list as belonging to the reporting interval if the measurement interval of the ranked measurement list occurs during the reporting interval; and generating a ranked reporting list of entity instances for each reporting interval by merging the ranked measurement lists belonging to the reporting interval, the ranked reporting list of entity instances for each reporting interval being a list in which the entity instances are ranked according to the number of times each type of entity instance occurred in the ranked measurement lists, and each ranked reporting list having cardinality equal to or less than the first cardinality. Other embodiments of this aspect include corresponding systems, apparatus, and computer program products.

One or more of the following advantages can be realized by implementations of the subject matter described herein. An entity type counting and reporting system can generate reports of the top N accessed entity instance types in an enterprise system using O(2*N) storage. The entity instance type counting system can incorporate newly accessed entity types into reports in real or near-real time. Intervals used to count the entity types may be based on the number of unique entity types accessed or may be time based. The length of time or number of accesses used to measure the intervals may be changed based on available memory, or by the volume of entities accessed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
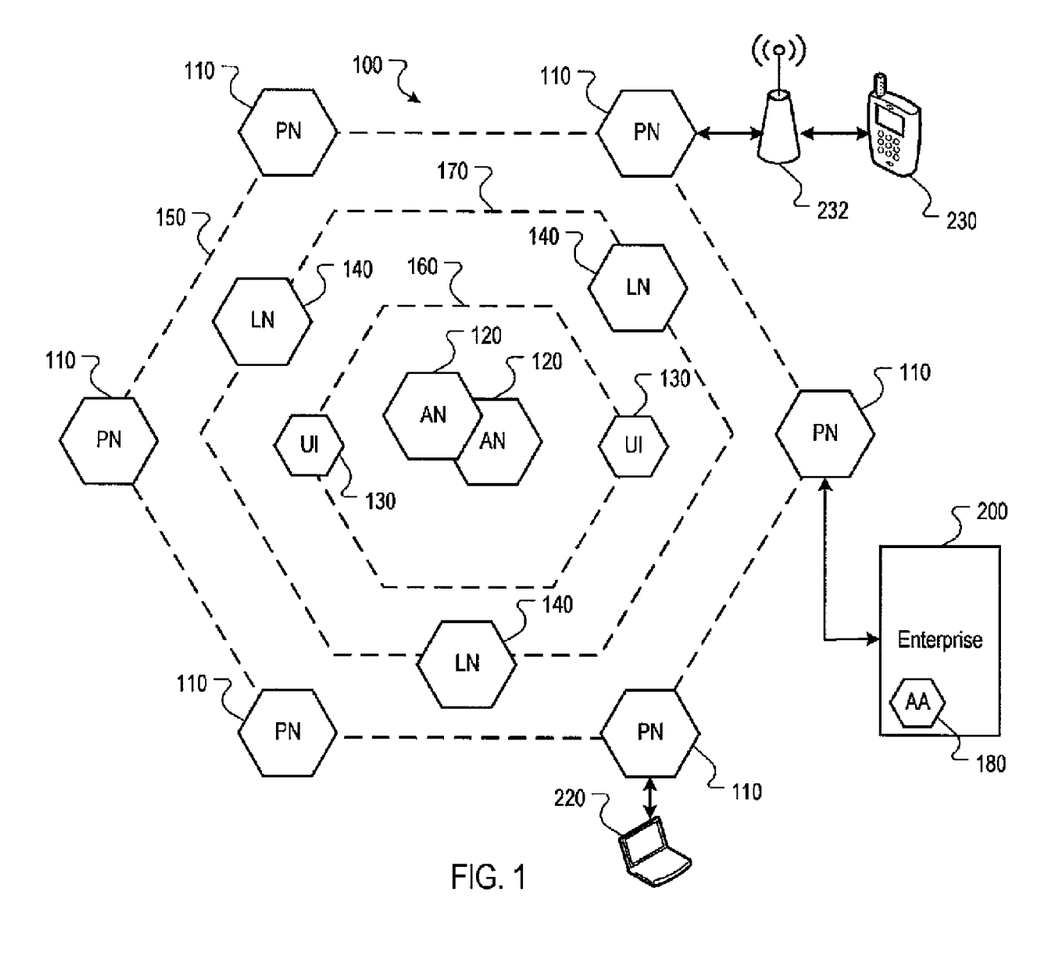
FIG. 1 is a block diagram of a distributed security system 100.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d_1, d_2, \ldots, d_n]$ for a content item of one or more parts $C=[c_1, c_2, \ldots, c_m]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c_1, c_2, \ldots, c_m]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system. Additionally, each logging node 140 can perform statistical operations and analysis on the data stored at the node and/or observed by the node 140. In some implementations, the logging node 140 can perform instance counting and ranking of types entity instances. Entity instance types may include files, websites, directories, domains, network resources, network devices, and other network properties, for example.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, within the enterprise an access agent 180 can be configured to perform MPLS labeling.

In another transparent proxy mode example, a protected system, such as the enterprise 200, may identify a processing node 110 as a next hop router for communication with the external servers.

§2.0 Example Logging Node Including Entity Ranking Component

Figure 2:
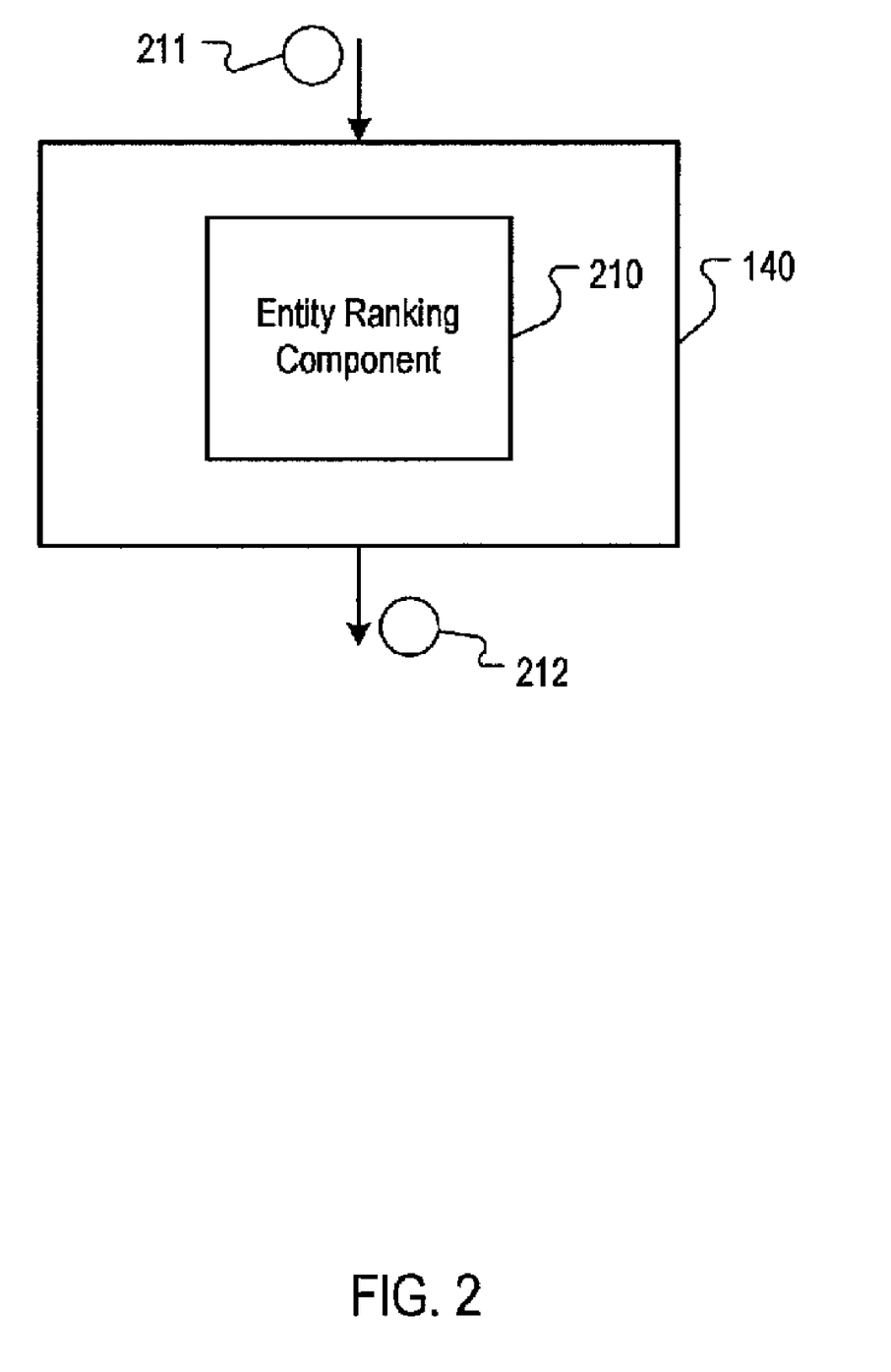
FIG. 2 is a block diagram of a logging node including an entity ranking component.

FIG. 2 is a block diagram of a logging node including an entity ranking component. The logging node 140 may further include an entity ranking component 210. The entity ranking component 210 may count entity instances, e.g., the occurrence of entities being accessed or requested in an enterprise system 200, and the types of entities accessed or requested. In addition, the entity ranking component 210 may rank the entity types according to the number of accesses and/or requests for access counted for each entity type. In some implementations, the entity ranking component 210 may provide the top ranked entities in a report 212. The report 212 may have a cardinality of ranked entity types requested by a user or administrator of the enterprise server 200. For example, a list of the top 5, 10, 20, or 100 ranked entity types may be provided by the entity ranking component 210 in the report 212. Further, the report 212 may be provided for a specified reporting interval. For example, the report 212 may be provided for the past year, month, week, day, or hour. The cardinality of the report 212 and the reporting interval covered by the report 212 may be specified by a requesting user or administrator, for example.

The entity ranking component 210 may monitor entity instances 211 of the entities. Each entity instance 211 may have an associated entity type. The type may correspond to the particular webpage, domain, file, or other network property associated with the entity, for example. For example, requests for access to a web page having the address www.example1.com can be an entity instance of a first type; and requests for access to a web page having the address www.example2.com can be an entity instance of a second type, and so on.

The entities instances 211 may also have associated time stamps. The time stamp associated with each entity instance may indicate at approximately what time the entity was accessed. In some implementations, the entity instances 211 are monitored by the entity ranking component 210 the same time that the entity is accessed. By providing the instances of entities 211 to the entity ranking component 210, the rankings in the reports 212 may be updated in real, or near real, time for example. In other implementations, the entity instances 211 may be provided to the entity ranking component 210 from a server or web access log, for example.

The entity ranking component 210 may monitor entity instances 211 over measurement intervals. In some implementations, the measurement intervals are defined by units of time. For example, a measurement interval may be 5 minutes, 10 minutes, or 1 hour. In other implementations, the measurement intervals are defined by the number of types associated with the monitored entity instances 211. For example, after the entity ranking component 210 receives a cardinality of entity instance types, the measurement interval is ended and new measurement interval may begin. The cardinality may be specified by a user or administrator associated with the enterprise server 102 and may depend on the memory or resources available to the entity ranking component, for example. In other implementations, the measurement intervals are defined by the number of entity instances 211 monitored, e.g., 1,000,000 webpage request, regardless of the number of types of entity instances 211.

The entity ranking component 210 generates ranked lists of the entity instance types 211 monitored during a measurement interval. The ranked list may include entity instances in which the types of entity instances are ranked according to the number of times each type of entity instance occurred during the corresponding measurement interval.

The entity ranking component 210 also specifies reporting intervals. In some implementations, a reporting interval is defined by a measure of time, for example, 1 hour, 1 day, or 1 week, and may have one or more measurement intervals that belong to it. For example, measurement intervals that occurred during the measure of time associated with the reporting interval belong to the reporting interval. In other implementations, a reporting interval is defined by a fixed number of measurement intervals (e.g., 1000) and may be independent of a period of time.

The entity ranking component 210 may generate reports 212 for a reporting interval including a ranked list of the entity instance types identified during the one or more measurement intervals belonging to the reporting interval. In one implementation, the report 212 may be generated by summing the number of each entity instance type in the ranked lists from each measurement interval, and generating a list of the ranked summed entity instance types. In some implementations, the report 212 has a cardinality that is the same or less than the cardinality of the ranked lists from each measurement interval. For example, if the cardinality of the ranked lists from the measurement intervals was 1000, then the cardinality of the report 212 can be 500. Because the number of accesses to the top N entities in enterprise systems tend to be much greater than the number of accesses to the entities that are not in the top N, it may only be necessary to count the top 2*N entities accessed in a particular enterprise system 200 in measurement intervals to accurately determine the top N entities accessed in a report 212.

§3.0 More Detailed Description of Entity Ranking Component

Figure 3:
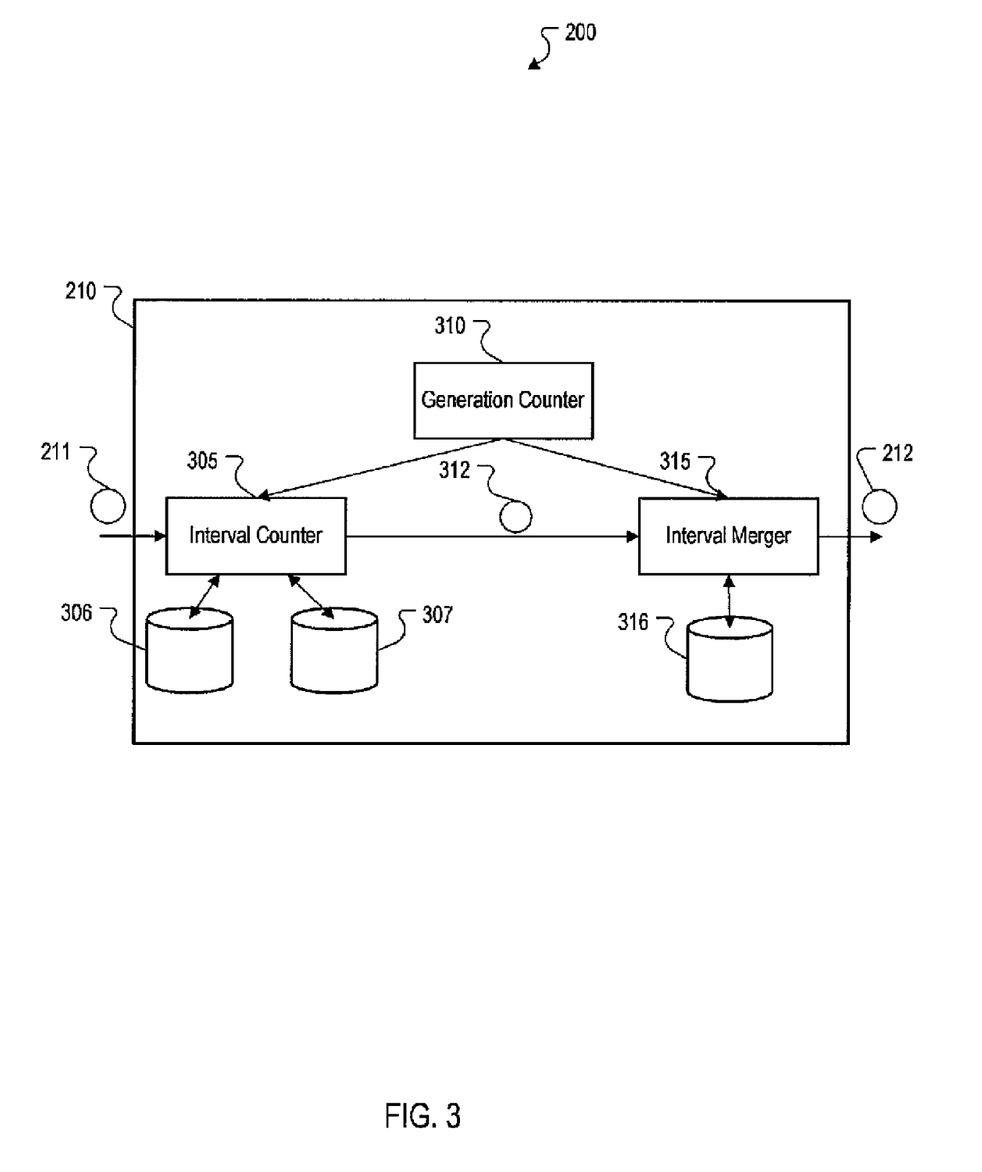
FIG. 3 is a more detailed view of the entity ranking component illustrated in FIG. 2.

FIG. 3 is a more detailed view of the entity ranking component 210 illustrated in FIG. 2. The entity ranking component 210 monitors entity instances 211 from the enterprise server 200 by use of an interval counter 305. The interval counter 305 may count unique entity types of monitored entity instances 211 during measurement intervals. In some implementations, the measurement intervals may correspond to a specified interval of time. For example, in some implementations, the intervals may be 1 hour or 1 minute in length. The length of the measurement interval selected may depend on a variety of factors including, but not limited to, the volume of entity instances monitored and the amount of memory or resources available to the interval counter 305, for example.

The interval counter 305 may count occurrences of instances of each unique entity type, and generate a tuple, list, or other data structure 312 identifying entity instance types that have the highest associated count (i.e., were observed the most) during the measurement interval. Each entity type identified in the list 312 may further include the count of the number of times that the type was counted. The list 312 may identify the top ranked entities instance types and may have a cardinality that is equal to, or greater than a cardinality that was specified for the report 212. For example, if the report 212 was for the top 200 entity instance types (i.e., a cardinality of 200) requested from the enterprise server 200, then the list 312 may have a cardinality of 400.

Each list 312 belongs to a reporting interval. The reporting interval for each list 312 may be determined by a generation counter 310. For example, the reporting interval may specify a period of time, and each list 312 generated during a measurement interval that occurs during that period time may belong to that reporting interval. A reporting interval may correspond to a particular hour, day, week, or month, for example. The amount of time associated with a reporting interval may be specified by a user or administrator associated with the enterprise server 200. In some implementations, the generation counter 310 may tag or associate the lists 312 with a reporting interval when they are generated by the interval counter 305. In other implementations, the reporting interval associated with a particular list 312 may be determined by querying the generation counter 310, for example.

The entity ranking component 310 also includes an interval merger 315. The interval merger 315 receives the lists 312 from the interval counter 305 and store the received lists in a list data store 316. The interval merger 315 merges the lists 312 associated with a reporting interval to generate a ranked report 212 of the top observed entity instance types for a reporting interval. In some implementations, the interval merger 315 may generate the report 212 by selecting the lists 312 associated with the same reporting interval from the list data store 316 and summing the lists 312 together by adding the counts of duplicate entity instance types appearing in the lists 312. The entities instance types having the highest associated counts are used to generate the report 212 for the reporting interval. In some implementations, the report 212 has a cardinality that is less than or equal to the cardinality of one of the lists 312. For example, if one of the lists 312 had a cardinality of 300, then the cardinality of the report 212 may be 200.

In some implementations, the interval counter 305 may generate a list 312 for a measurement interval by keeping a running count of the number of each entity instance type monitored. For example, the interval counter 305 may enter each entity instance type observed in a table along with an associated count variable. The count variable may be incremented each time the particular entity instance type is monitored. At the end of the measurement interval, the entity instance types with the top 2*N counts may be used to determine the list 312.

In other implementations, the interval counter may generate a list 312 for a measurement interval using a winners table 306 for counting monitored entity instance types in the top 2*N of monitored entity instance types, and one or more contentions table 307 for counting monitored entity instance types not in the top 2*N of monitored entity instance types. In addition, there may be no limit to the cardinality of the contention table 307. In some implementations, the winners table 306 and contentions table 307 may be implemented as hash tables, for example. In particular, the winners table 306 may be implemented using a collision-free hash table. However, other data structures may also be used.

In one implementation, the interval counter 305 may first populate the winners table 206 with observed entity instance types until the winners table has 2*N entries and then may populate the contentions table 307 with observed entity instance types for a measurement interval. If an entity instance type in the contentions table 307 has a count that is higher than an entity instance type in the winners table 307, the entities may be swapped. The measurement interval may end when the time period associated with the measurement interval expires.

In another implementation, the interval counter 305 may first populate the contentions table 307 until the count associated with an entity instance type in the contentions table exceeds a maximum count for the contentions table 307, after which the entity instance is moved to the winners table 306. The measurement interval may end when the winners table 307 has 2*N entity instance types.

For example, in some implementations the maximum count value may be 1. The maximum count of 1 may be chosen because, in some enterprise systems 200, after an entity instance type has been observed more than once in the measurement interval, it is likely that the entity instance type will be in the top 2*N of observed entity instance types. However, other maximum count values may be chosen. After being observed two times by the interval counter 305, an entity instance type is placed in the winners table 306. After the winners table 306 becomes full, the measurement interval ends, and the list 312 is generated by the interval counter 305.

While only one contentions table 307 was discussed above for use in an measurement interval, in other implementations, the interval counter 305 may maintain several contentions tables 307. Each contentions table 307 may be associated with a maximum count value. For example, the interval counter 305 may maintain two contentions tables 307 and one winners table 306. The first contentions table 307 may be associated with a maximum count value of 5 and the second contentions table 207 may be associated with a maximum count of 10, for example. When a particular entity instance type is first observed, it is placed into the first contentions table 307. After subsequent occurrences of the entity instance type its count in the first contentions table is increased until it exceeds the maximum count value for that table (i.e., 5). After exceeding the maximum count the entry for the entity instance type is moved to the second contentions table 307, where it may remain, or may be moved to the winners table 306 after the count exceeds the maximum for the second contentions table. The measurement interval may end when the winners table 306 has 2*N entries.

§4.0 Example Processes for Generation Entity Ranking Reports

Figure 4:
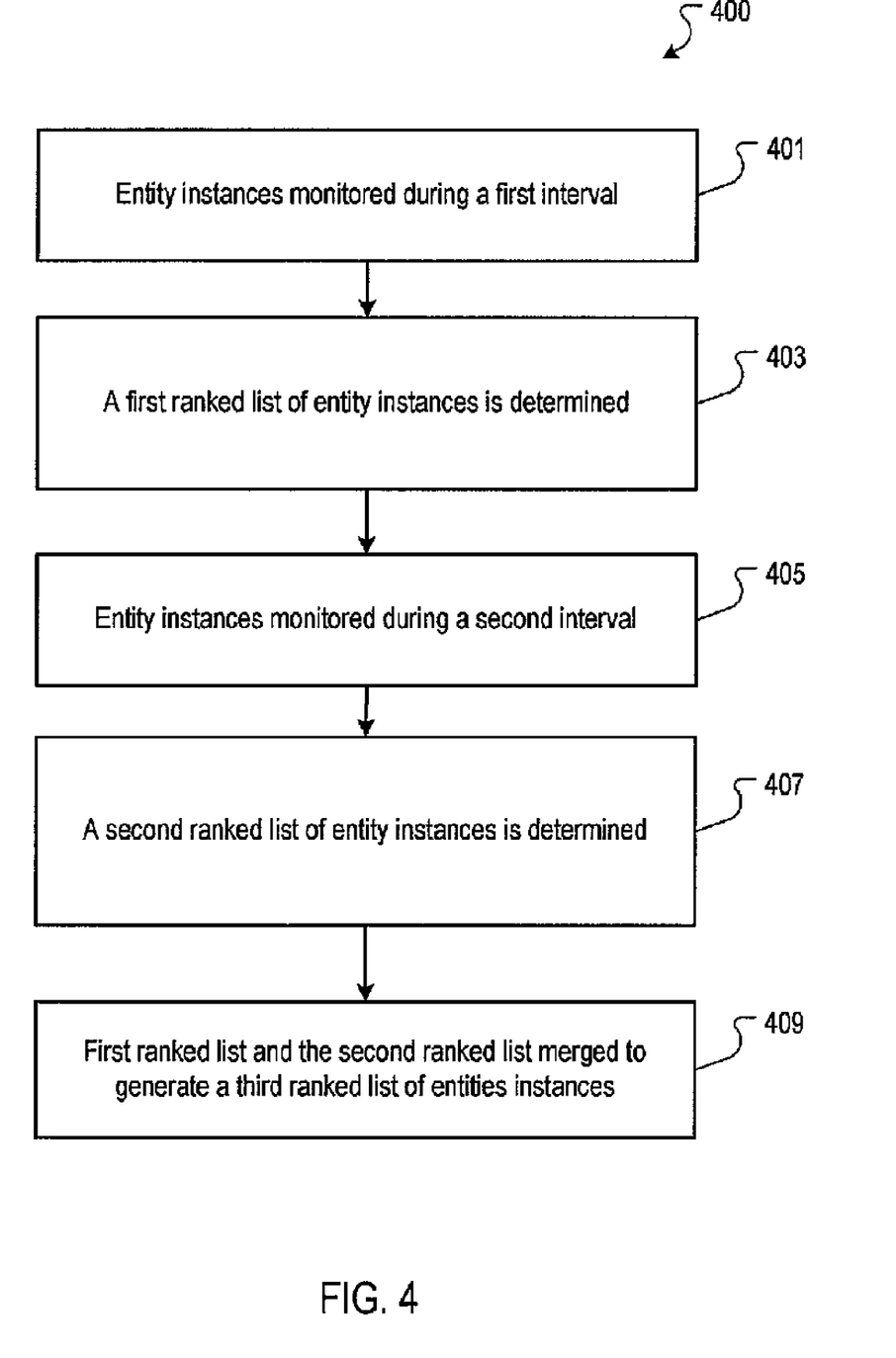
FIG. 4 is a flow diagram of an example process for generating a report ranking entities.

FIG. 4 is an example process 400 for generating a report ranking entities. The process 400 may be implemented, for example, by an entity ranking component 210.

Entity instances are monitored during a first interval (401). The entities instances 211 may be monitored by the interval counter 305. Each observed entity instance 211 may be one of several types of entity instances. For example, an entity instance type may refer to a specific web page, domain, file, network resource, or other network property. The first interval may be a measurement interval corresponding to a length of time, or a number of entity instance types monitored, for example. In some implementations, the types of the monitored entity instances 211 are entered into a table with a count value representing the number of times an entity instance 211 of that type occurs.

A first ranked list of entity instances is determined (403). The first ranked list may rank the entity instances according to the number of times each type of entity instance occurred during the first interval. The first ranked list may be determined by the interval counter 306. The first ranked list may have a cardinality of types of entity instances. For example, the first ranked list may rank 100 different entity instance types.

In some implementations, the first ranked list may be associated with a reporting interval. The reporting interval may be assigned by the generation counter 310, for example. The reporting interval may identify the period of time that the first interval belongs to, or is part of. For example, if the reporting interval is hourly, then the reporting interval may identify what hour the first interval occurred during.

Entity instances are monitored during a second interval (405). The entities instances 211 may be monitored by the interval counter 305. The second interval may occur during the same reporting interval as the first interval, for example.

A second ranked list of entity instances is determined (407). The second ranked list may be determined by the interval counter 306. The second ranked list may have a cardinality of types of entity instances equal to the cardinality of types of entity instances of the first list.

The first ranked list and the second ranked list are merged to generate a third ranked list of entities instances (409). In some implementations, the interval merger 315 may merge the first and second lists. The thirds list may be generated by summing the occurrences associated with the same entity types in the first and second list. The cardinality of entity types in the third list may be equal or less than the cardinality of entity types in the first and second list. For example, if the cardinality of the first list was 800, then the cardinality of the third list may be 500. The third list may then be output by the interval merger 315 as a ranked entity type report 212, for example.

Figure 5:
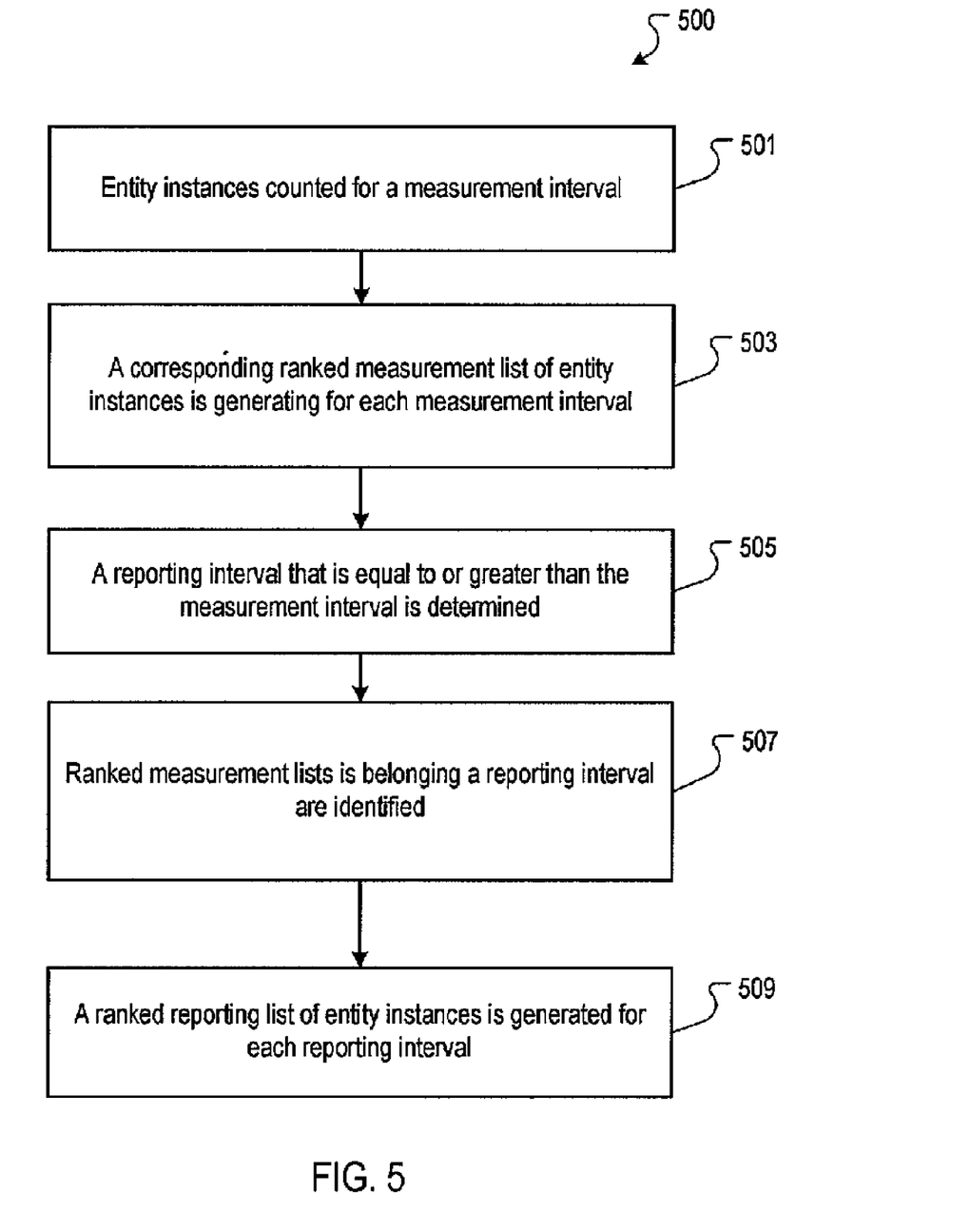
FIG. 5 is a flow diagram of an example process for generating a report ranking entities.

FIG. 5 is an example process 500 for generating a report ranking entities. The process 500 may be implemented, for example, by an entity ranking component 210

Entity instances are counted for measurement intervals (501). The entity instances 211 may be counted by the interval counter 305. Each entity instance 211 may be one of a plurality of entity types. In some implementations, each measurement interval is a period of time, for example, 1 minute. In other implementations, the measurement interval corresponds to the number of entity instance types counted. For example, after 1000 entity instance types are counted the measurement interval is over and another measurement interval may begin.

A corresponding ranked measurement list of entity instances is generated for each measurement interval (503). The ranked measurement lists may be generated by the interval counter 305. The ranked measurements lists may be generated according to the number of times each type of entity instance occurred during the corresponding measurement interval. The ranked measurement lists may include a number of rankings equal to a first cardinality. For example, a user or administrator of the enterprise system 200 may specify a desired number of entity types to rank in a report 212. The first cardinality may be based on the desired number of entity types to rank in the report 212. In some implementations, the first cardinality is twice the specified number of entity types to rank.

A reporting interval that is equal to or greater than the measurement interval is determined (505). The reporting interval may specify a period of time for the report 212. In some implementations, the reporting interval is specified by a user or administrator associated with the enterprise server 200, for example. The reporting interval may be equal to or greater than the measurement intervals. For example, the measurement and the reporting intervals may be each 1 minute, or the measurement interval may be 1 minute and the reporting interval may be 1 hour.

Ranked measurement lists belonging to a reporting interval are identified (507). The measurement lists may be identified by the generation counter 310. A measurement list may be identified as belonging to a reporting interval if the associated measurement interval occurred during a period of time associated with the reporting interval. For example, if a reporting interval is between 1 pm and 2 pm, then any measurement intervals occurring between 1 pm and 2 pm belongs to that reporting interval.

A ranked reporting list of entity instances is generated for each reporting interval (509). The ranked reporting lists may be generated by the interval merger 315, for example. In some implementations, the ranked reporting list of entity instances for each reporting interval is generated by merging the ranked measurement lists belonging to the same reporting interval. In some implementations, the count associated with the same entity instance types in each ranked measurement list may be summed. In addition, the ranked reporting list may have cardinality equal to or less than the first cardinality. For example, if the first cardinality is 1500, then the cardinality of the ranked reporting list may be 750.

Figure 6:
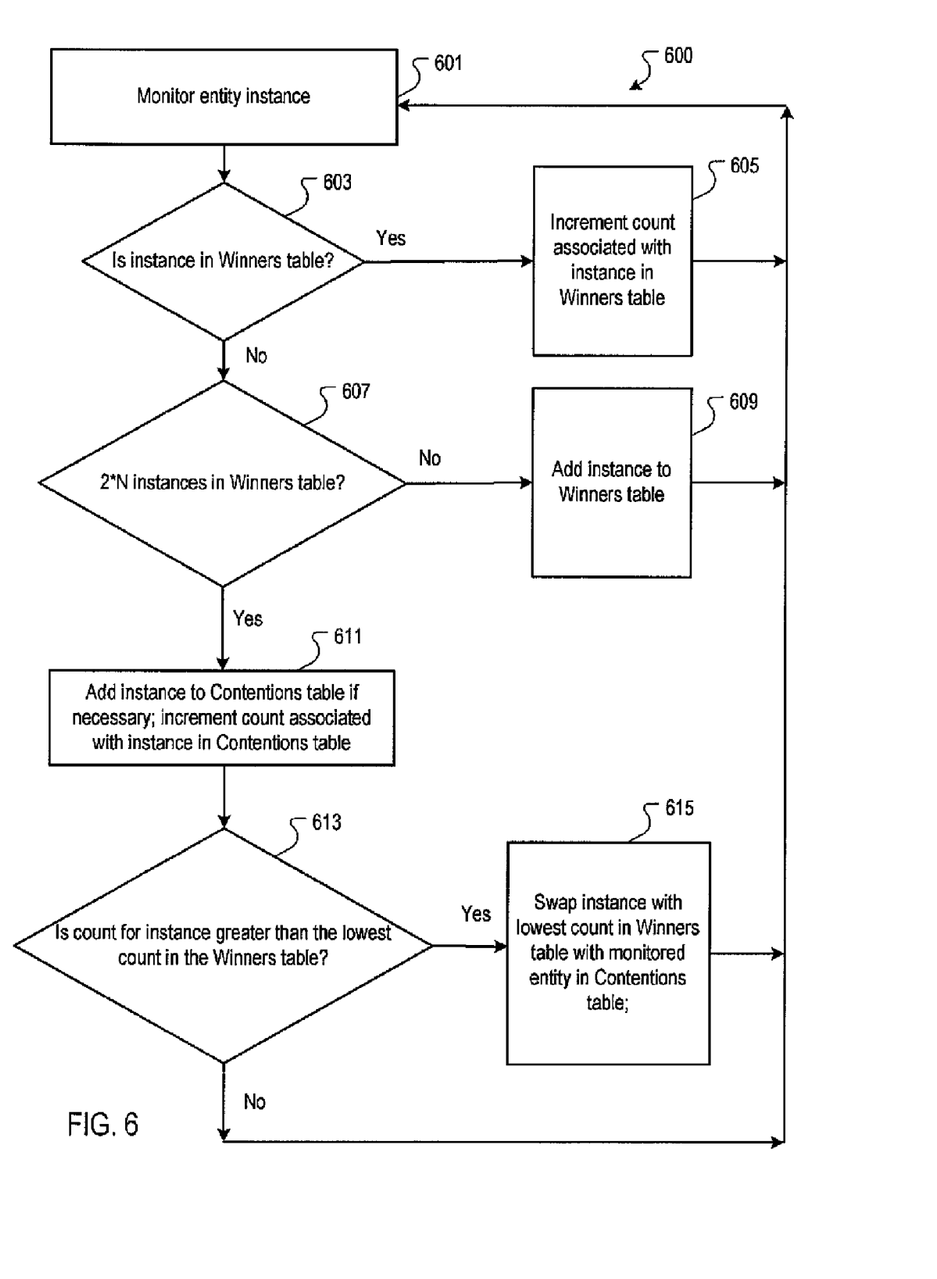
FIG. 6 is a flow diagram of an example process for generating a list of ranked entities for a measurement interval.

FIG. 6 is a flow diagram of an example process 600 for generating a list of ranked entities types for a measurement interval. The process 600 can, for example, be implemented in the interval counter 305 illustrated in FIG. 3.

An entity instance 211 is monitored by the interval counter 305 (601). The entity instance 211 may be monitored by the interval counter 305 from the enterprise server 200. The entity instance 211 may be one of many entity instance types that identify particular files, webpages, domains, and other network properties, for example. In some implementations, the entity instance may be read from a server log, for example.

The interval counter 305 determines if the type of the monitored entity instance 211 is in the winners table 306 (603). As described above, the winners table 306, is a collision-safe hash table, or other data structure, with 2*N entries, where N represents the number of entity instance types that are to be ranked for the report 212. If the type is in the winners table 306 (i.e., the entity instance type has already been observed this measurement interval), then the count associated with the entity instance type in the winners table 306 is incremented by 1 (605). The interval counter 305 may then await to monitor a new entity instance 111 (601).

If the entity instance type is not in the winners table 306, then the interval counter may determine if the winners table 306 has 2*N entries (607). If the winners table 306 does not have 2*N entries, then the entity instance type is added to the winners table 206 and the count associated with the entity instance type is set to 1 (609). The interval counter 305 may then await to monitor a new entity instance 211 (601).

If the winners table 306 has 2*N entries, then the entity instance type is added to the contentions table 307 (611). The contentions table 307 may be a hash table, for example. If there is already entry in the contentions table 307 for the entity instance type, then the count associated with the entity instance type is incremented by 1. Else, the entity instance type is entered into the contentions table 307 and the count associated with the entity is initialized to 1, for example.

The interval counter 305 determines if the count associated with the entity instance type in the contentions table 307 is greater than the minimum count associated with an entity instance type in the winners table 306 (613). If the count is less than the minimum count, then the interval counter 305 awaits to monitor a new entity instance 211 (601). If the count is greater than the minimum count, then the entity instance type associated with the minimum count is swapped with the monitored entity instance type in the contentions table 307 (615). The interval counter 305 may then await to monitor a new entity instance 211 (601). At the end of the measurement interval the winners table 306 may be used to generate the ranked list 312 of entity types for the measurement interval, for example.

Figure 7:
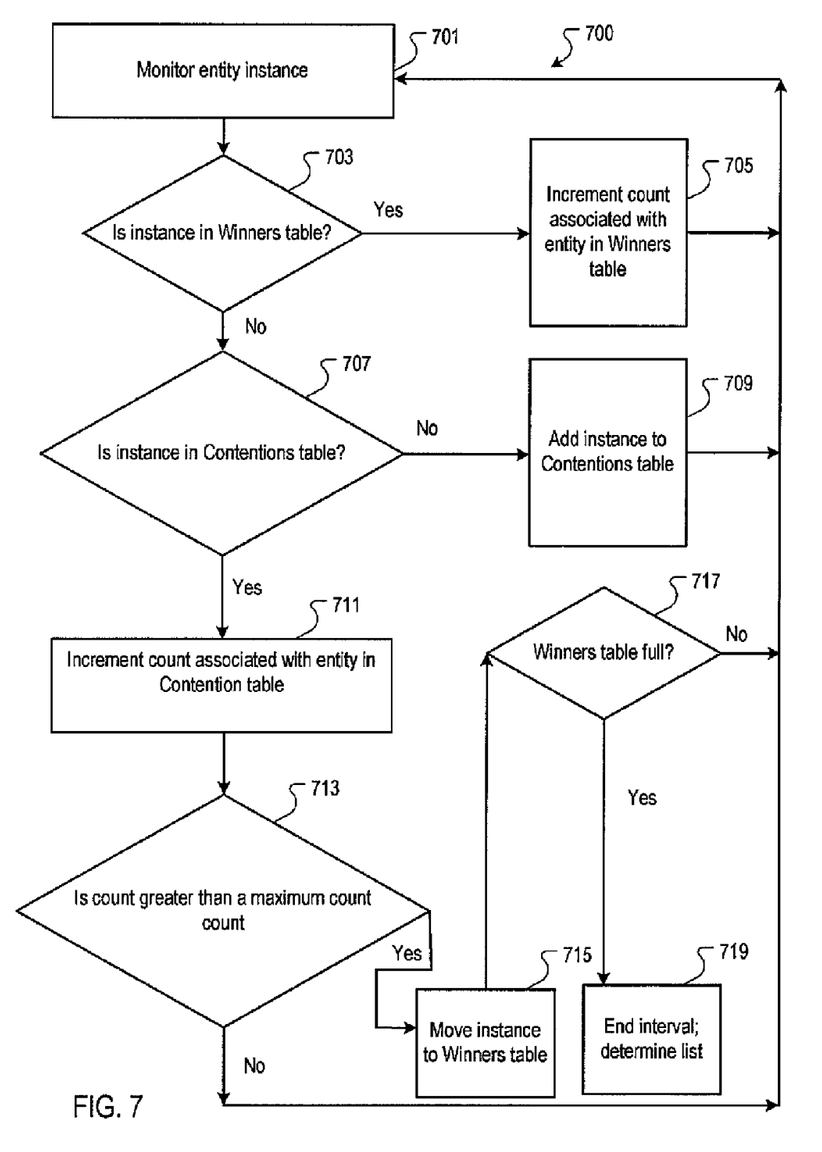
FIG. 7 is a flow diagram of an example process for generating a list of ranked entities for a measurement interval.

FIG. 7 is a flow diagram of an example process 700 for generating a list of ranked entities for a measurement interval. The process 700 can, for example, be implemented in the interval counter 305 illustrated in FIG. 3.

An entity instance 211 is monitored by the interval counter 305 (701). The entity instance 211 may be one of many entity instance types that indicate particular files, webpages, domains, and other network properties, for example.

The interval counter 305 determines if the type of the monitored entity instance 211 is in the winners table 306 (703). As described above, the winners table 306, is a collision-safe hash table, or other data structure, with 2*N entries, where N represents the number of entity instance types that are to be ranked for the measurement interval.

If the entity instance type is in the winners table 306, then the count associated with the entry for the entity instance type in the winners table 306 is incremented by 1 (705). The interval counter 305 may then await to monitor a new entity instance 211 (701).

If the entity instance type is not in the winners table 306, then the interval counter 305 may determine if the entity instance type is in the contentions table 307 (707). The contentions table 307 may be a hash table, or other data structure, for storing entity instance types along with associated count variables. In some implementations, the entries in the contentions table 307 have a maximum associated count variable. Entries that have a count value that exceeds the maximum count value are moved into the winners table 306. In some implementations, the maximum count value is 1 and the count may be implemented as a bit variable. However, a variety of minimum count values may be selected such as 5, 10, and 15. The optimum value selected for the maximum count value may be dependent on the length or size of the measurement interval, and the typical number of entity instance types typically monitored in a measurement interval, for example.

If the entity instance type is not in the contentions table 306, then the entity instance type is added to the contentions table 307 (709) and the interval counter 305 may await to monitor a new entity instance 211 (701). If the observed entity instance type is in the contentions table 307, then the count value associated with the entity instance type in the contentions table 307 is incremented (711).

The interval counter 305 determines if the count value associated with the entity instance type is greater than the maximum count value (713). If the count value is not greater than the maximum count value, then the interval counter 305 may await to monitor a new entity instance 211 (701). If the count value is greater than the maximum count value, then the entry instance type in the contentions table 307 is moved to the winners table 306 (715).

The interval counter 305 determines if the winners table 306 is full (717). In some implementations, the winners table 306 is full when the number of entries equals 2*N, where N is the number of entities to rank in the report 212. However, a larger or smaller winners table 306 may also be used. If the winners table 306 is not full the interval counter 305 may await to monitor a new entity instance 211 (701).

If the winners table 306 is full, then the measurement interval is over and a list 312 may be generated for the measurement interval (719). The generated list 312 may contain the identified entity types from the winners table 306 and the associated count values. The generated list 312 may be sent by the interval counter 305 to the interval merger 315, for example. In some implementations, the generation counter 310 may assign the list 312 to a reporting interval. The interval merger 315 may generate a report 212 for the reporting interval by merging the lists 312 assigned to the same reporting interval, for example.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ('WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details; these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
monitoring entity instances during a first interval, each entity instance being one of a plurality of types of entity instances;
determining from the entity instances monitored during the first interval a first ranked list of entity instances in which the types of entity instances are ranked according to the number of times each type of entity instance occurred during the first interval, the first ranked list having a first cardinality of types of entity instances;
monitoring entity instances during a second interval, each entity instance being one of the plurality of types of entity instances;
determining from the entity instances monitored during the second interval a second ranked list of entity instances in which the types of entity instances are ranked according to the number of times each type of entity instance occurred during the second interval, the second ranked list having the first cardinality of types of entity instances; and
merging the first ranked list and the second ranked list into a third ranked list of entities instances in which the types of entity instances are ranked according to the number of times each type of entity instance occurred during the first interval and the second interval;
wherein monitoring entity instances during a first interval comprises:
entering monitored entity instances in a first table until the first table has the first cardinality of entries;
entering monitored entity instances in a second table after the first table has the first cardinality of entries;
determining if an entity instance in the second table has a greater count than an entity instance in the first table; and
swapping the entity instance in the second table with the entity instance in the first table if the entity instance in the second table has a greater count than the entity instance in the first table.

2. The method of claim 1, wherein the entity instance type is a webpage, file, domain, or network property.

3. The method of claim 1, wherein the measurement interval is defined by a period of time.

4. The method of claim 1, wherein the measurement interval is defined by the number of entity instance types monitored.

5. The method of claim 1, wherein merging the first ranked list and the second ranked list comprises:
summing the number of times each entity type occurred in the first interval with the number of time the same entity type occurred during the second interval; and
generating the third ranked list of entity instances from the sums of the number of times each entity type occurred in the first interval with the number of time the entity type occurred during the second interval.

6. The method of claim 1, wherein the third ranked list has a second cardinality that is less than or equal to the first cardinality.

7. The method of claim 6, wherein the second cardinality is half of the first cardinality.

8. The method of claim 1, wherein the first ranked list is determined from the first table.

9. The method of claim 1, wherein the first table is a collision-safe hash table.

10. The method of claim 1, wherein monitoring entity instances during a first interval comprises:
entering monitored entity instances in a first table;
determining if an entity instance in the first table has a count that is greater than a threshold count;
entering the entity instance in a second table if the entity instance in the first table has a count that is greater than the threshold count;
determining if the second table has the first cardinality of entries; and
ending the first interval if the second table has the first cardinality of entries.

11. The method of claim 10, wherein the first ranked list is determined from the second table.

12. A method comprising:
monitoring entity instances during a first interval, each entity instance being one of a plurality of types of entity instances;
determining from the entity instances monitored during the first interval a first ranked list of entity instances in which the types of entity instances are ranked according to the number of times each type of entity instance occurred during the first interval, the first ranked list having a first cardinality of types of entity instances;
monitoring entity instances during a second interval, each entity instance being one of the plurality of types of entity instances;
determining from the entity instances monitored during the second interval a second ranked list of entity instances in which the types of entity instances are ranked according to the number of times each type of entity instance occurred during the second interval, the second ranked list having the first cardinality of types of entity instances; and
merging the first ranked list and the second ranked list into a third ranked list of entities instances in which the types of entity instances are ranked according to the number of times each type of entity instance occurred during the first interval and the second interval;

wherein monitoring entity instances during a first interval comprises:

entering monitored entity instances in a first table;

determining if an entity instance in the first table has a count that is greater than a threshold count;

entering the entity instance in a second table if the entity instance in the first table has a count that is greater than the threshold count;

determining if the second table has the first cardinality of entries; and ending the first interval if the second table has the first cardinality of entries.

13. The method of claim 12, wherein the entity instance type is a webpage, file, domain, or network property.

14. The method of claim 12, wherein the measurement interval is defined by a period of time.

15. The method of claim 12, wherein the measurement interval is defined by the number of entity instance types monitored.

16. The method of claim 12, wherein merging the first ranked list and the second ranked list comprises:

summing the number of times each entity type occurred in the first interval with the number of time the same entity type occurred during the second interval; and generating the third ranked list of entity instances from the sums of the number of times each entity type occurred in the first interval with the number of time the entity type occurred during the second interval.

17. The method of claim 12, wherein the third ranked list has a second cardinality that is less than or equal to the first cardinality.

18. The method of claim 17, wherein the second cardinality is half of the first cardinality.

19. The method of claim 12, wherein monitoring entity instances during a first interval comprises:

entering monitored entity instances in a first table until the first table has the first cardinality of entries;

entering monitored entity instances in a second table after the first table has the first cardinality of entries;

determining if an entity instance in the second table has a greater count than an entity instance in the first table; and swapping the entity instance in the second table with the entity instance in the first table if the entity instance in the second table has a greater count than the entity instance in the first table.

20. The method of claim 19, wherein the first ranked list is determined from the first table.

21. The method of claim 19, wherein the first table is a collision-safe hash table.

22. The method of claim 12, wherein the first ranked list is determined from the second table.

* * * * *